No. 896,039.

PATENTED AUG. 11, 1908.

O. E. NOBLE.
REGULATED AUTOMATIC SWINGING CHECK VALVE WITH OVERFLOW ATTACHMENT.
APPLICATION FILED FEB. 19, 1906.

2 SHEETS—SHEET 2.

WITNESSES

INVENTOR
OLIVER E. NOBLE.
BY
ATTORNEYS

UNITED STATES PATENT OFFICE.

OLIVER EZRA NOBLE, OF HOBART, OKLAHOMA.

REGULATED AUTOMATIC SWINGING CHECK-VALVE WITH OVERFLOW ATTACHMENT.

No. 896,039.　　　　　Specification of Letters Patent.　　　Patented Aug. 11, 1908.

Application filed February 19, 1906. Serial No. 301,931.

*To all whom it may concern:*

Be it known that I, OLIVER EZRA NOBLE, a citizen of the United States, residing at Hobart, in the county of Kiowa, Oklahoma, have invented a new and useful Regulated Automatic Swinging Check-Valve with Overflow Attachment, of which the following is a specification.

My invention relates to a check valve to be placed somewhere near the foot of an elevated tank or similar reservoir that is not high enough to afford sufficient pressure in case of an extended fire, when it is desired to put direct pressure from the fire pump, and also to prevent the elevated tank or similar reservoir from over-flowing.

The objects of my invention are as follows: first, to provide a valve that will not interfere with having at all times the pressure in the water-works system, that will be produced by the height of water in the elevated tank or similar reservoir. Second, to provide an automatic device by which a direct fire pressure of any desired pressure can be had at the will of the pump operator without regard to the height of the elevated tank, or the height of water in said tank and at the same time prevent any serious water "hammer" when the valve closes or any oscillating motion of the valve when a number of hydrants are at once thrown open on the water system. Third, to provide means that will automatically close the check valve when the elevated tank or similar reservoir is full, and when the valve closes the operator at the power house will notice the increased pressure and the increased labors of the pump. He will stop the pumps and then the valve will open again and thus leave no obstructions in the way of elevated tank pressure when the elevated tank or similar reservoir is full.

Figure 1:
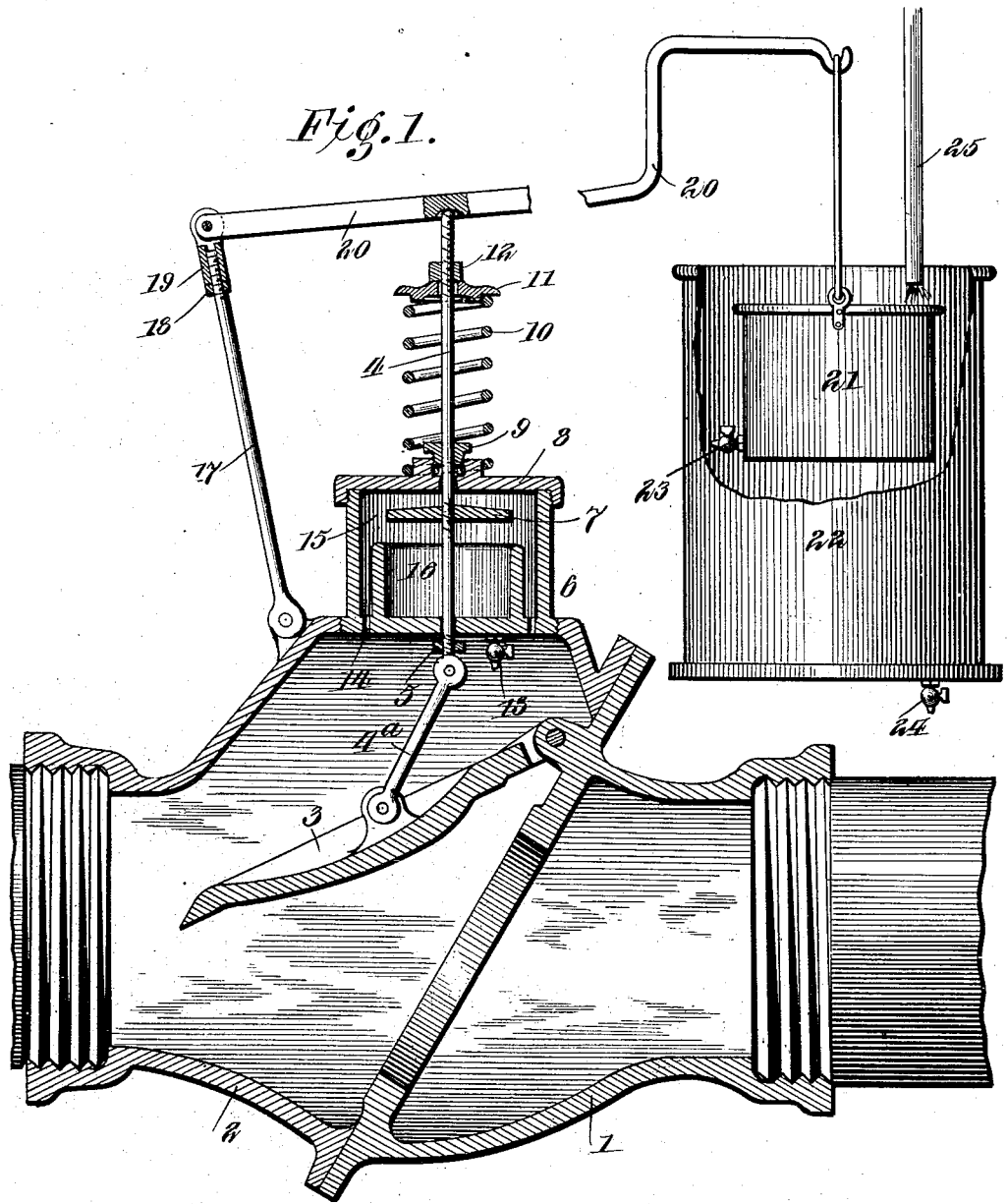
Figure 2:
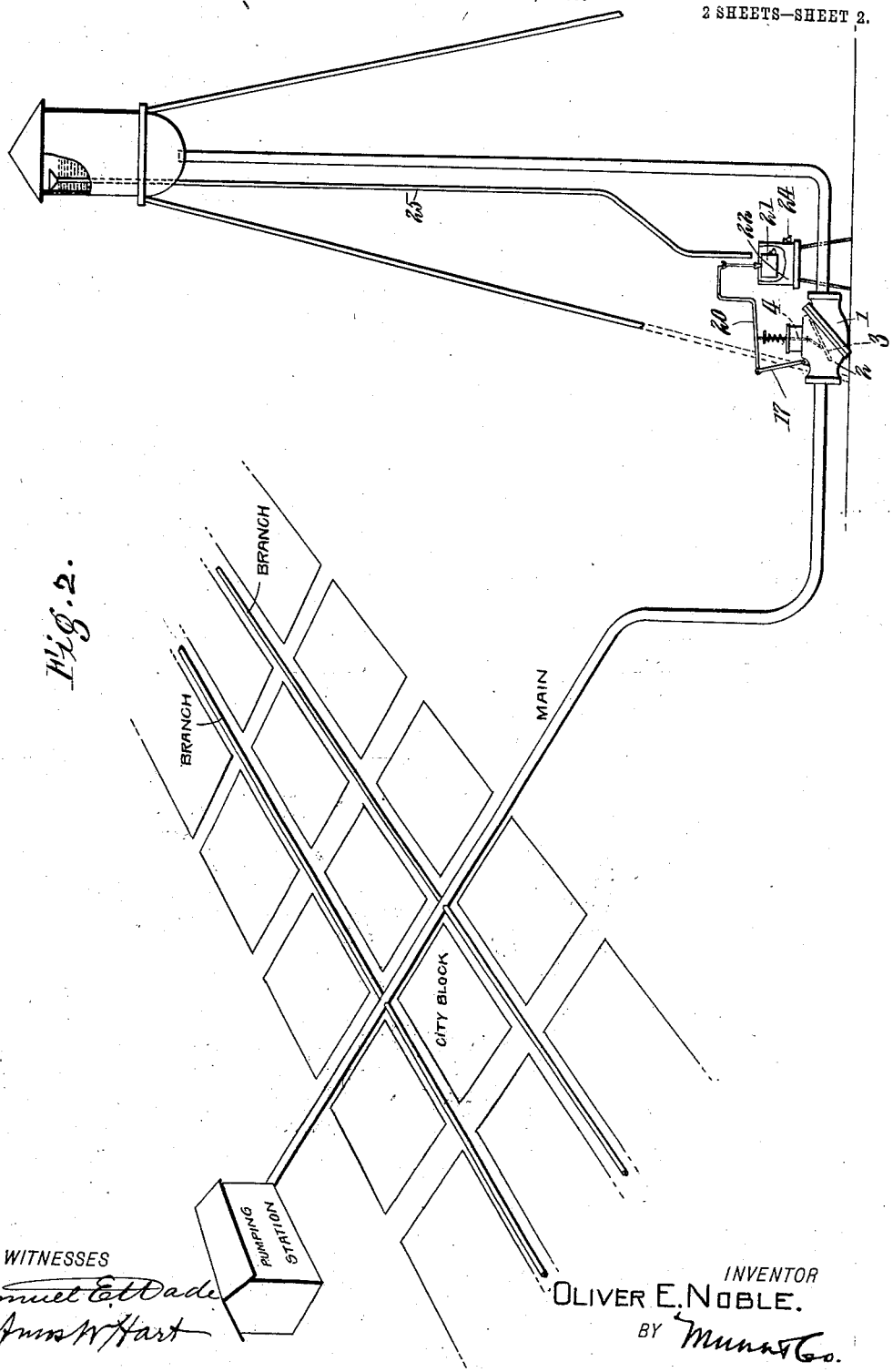

Figure 1 is a central longitudinal section of the check valve and its direct attachments. Fig. 2 is mainly a diagrammatic view showing the connection of my improvement with pipes leading to an elevated tank and a pumping station.

The numerals 1 and 2 indicate the casing of the hinged valve 3, or swinging gate, which has an inclined seat. The casing is made in two parts or sections for convenience of manufacture and repair. The valve stem is made in two parts 4 and 4ᵃ, which are hinged together within the chamber of the casing. The upper portion of stem section 4 is screw-threaded, and a nut 12 is applied thereto for regulating the tension of a spiral spring 10 that normally supports the valve in open position as shown.

6 is the main frame for the dash-pot feature.

7 is the disk which enters the dash-pot 16.

8 is the main support of the spring stem and also the stuffing box.

9 is the follower in the stuffing box.

10 is the spring by which the rate of water flowing toward the elevated tank is regulated and which prevents the positive action of the gate 3 as in ordinary swinging check valves.

11 is the plate through which tension is applied to spring (10).

12 is the nut by which the tension of the spring 10 is regulated by moving up or down on stem or rod 4.

13 is a cock which will regulate the speed of the water passing out of the cup of the dash-pot 16 and hence will regulate the speed with which 3 closes thereby reducing to a minimum the amount of "water hammer" caused by the closing of the valve.

14 is an opening allowing water to circulate into chamber 15.

15 is a water chamber.

16 is a water chamber or cup of the dash-pot.

17 is the fulcrum arm in the overflow device.

18 is a nut to regulate the length of 17.

19 is the fulcrum casting.

20 is a lever resting on the stem 4, whose fulcrum is at 19 and suspending bucket 21.

21 is a bucket into which overflow water from the elevated tank or similar reservoir will fall the weight of which will overcome spring through lever 20, thereby allowing gate 3 to close the valve preventing the overflow in the elevated tank.

The bucket 21 is suspended from lever 20, so as to rise and fall within a stationary bucket, or tank, 22. When bucket 21 is filled by overflow into pipe 25 from the elevated tank or reservoir, it descends in bucket 22 and thus closes the gate. The dash-pot, however, prevents the gate closing instantly, the same closing slowly instead, so that sufficient water overflows from tank to fill bucket 22. The water received into the latter escapes through cock 24, and the contents of bucket 21 also discharge slowly, so that it is lightened and rises to the former position, and the spring 10 again opens the gate 3.

Elevated water tanks are provided for municipal service for fire protection. Many towns use such tanks connected with an ordinary pumping system in the power house where are ordinarily located two pumps, one supplying water for ordinary daily consumption and filling the elevated tank which supplies the city with water during the night or whenever pumps are not running. My improved attachment is arranged at the foot of a stand-pipe through which water is pumped into the elevated tank, as indicated in Fig. 2. The swinging valve 3 allows water to flow through the tank pipe at any time, and, of course, when open it allows a certain amount of water to flow to the tank, it being forced up by the pump. In case a fire breaks out in the city or town the first water which the firemen use to extinguish the fire would be taken from the elevated tank; but if the fire should become extensive, the aid of the pump will be required. The pump being set to work at a high rate of speed water is forced rapidly through the pipe and past the valve with result that the valve closes thus shutting off the stand pipe and tank from the pumping system, which allows the pressure in the city pipes to be run up as high as required, or as the pump is capable of exerting. The closure of the valve 3 is also effected automatically by the overflow of water from the pipe 25 by which the bucket 21 is carried down, thus depressing the free end of the lever which in turn acts upon the valve through the jointed stem. My improved attachment thus obviates the necessity of any manual manipulation of the valve located in the main which is ordinarily required for shutting off a stand pipe and elevated tank from a pumping system.

What I claim is—

1. The combination with a water pipe and a check valve hinged therein, and a tank having an overflow pipe, of means for regulating the flow in the said water pipe by adjusting the valve, the same consisting of a lever and pivoted rod constituting the fulcrum of such lever, a jointed stem which operatively connects the lever with the valve, a spring support connected with the stem and serving to hold the valve normally elevated, a dash-pot whose disk or piston is attached to the valve stem, a water holder suspended from the free end of the lever and beneath the tank overflow pipe, and a receptacle into which such holder discharges, substantially as described.

2. The automatic apparatus formed by the combination with a water pipe for connecting a pump with a reservoir or supply tank, and a gate or valve in said pipe and adapted to open toward the pump end of the pipe, of a spring attachment for holding the gate normally open, a stationary tank or bucket arranged below the level of the reservoir, a movable bucket, and means for suspending it in the stationary one, such means being supported by the spring attachment, a dash-pot for preventing too quick closure of the gate when the movable bucket is filled, both buckets having discharge openings as shown and described.

OLIVER EZRA NOBLE.

Witnesses:
 CHAS. W. LENAN,
 WILLIAM L. HAYDON.